United States Patent
Yan et al.

(10) Patent No.: US 8,324,832 B2
(45) Date of Patent: Dec. 4, 2012

(54) CIRCUITS AND METHODS FOR CONTROLLING POWER OF LIGHT SOURCES

(75) Inventors: Tiesheng Yan, Chengdu (CN); Zhimou Ren, Chengdu (CN); Jun Ren, Chengdu (CN); Ching-Chuan Kuo, Taipei (TW)

(73) Assignee: O2Micro, Inc., Santa Clara, CA (US)

( * ) Notice: Subject to any disclaimer, the term of this patent is extended or adjusted under 35 U.S.C. 154(b) by 98 days.

(21) Appl. No.: 12/823,269

(22) Filed: Jun. 25, 2010

(65) Prior Publication Data
US 2011/0140616 A1 Jun. 16, 2011

(30) Foreign Application Priority Data
May 18, 2010 (CN) .......................... 2010 1 0176798

(51) Int. Cl.
*H05B 37/02* (2006.01)
(52) U.S. Cl. ........................................ 315/291; 315/224
(58) Field of Classification Search .................. 315/186, 315/224, 294, 291, 209 R
See application file for complete search history.

(56) References Cited

U.S. PATENT DOCUMENTS

| | | | |
|---|---|---|---|
| 7,667,683 B2* | 2/2010 | Chen et al. | 345/102 |
| 8,044,608 B2* | 10/2011 | Kuo et al. | 315/291 |
| 2005/0110469 A1 | 5/2005 | Inaba et al. | |
| 2005/0151708 A1* | 7/2005 | Farmer et al. | 345/82 |
| 2008/0316781 A1* | 12/2008 | Liu | 363/80 |
| 2011/0062887 A1* | 3/2011 | Hsu et al. | 315/294 |

FOREIGN PATENT DOCUMENTS

| | | |
|---|---|---|
| KR | 20070106176 A | 11/2007 |
| WO | 2010022182 A2 | 2/2010 |

\* cited by examiner

*Primary Examiner* — Douglas W Owens
*Assistant Examiner* — Amy Yang

(57) ABSTRACT

A driving circuit for driving a light source includes a power converter, a controller and a voltage-controlled current source. The power converter is coupled to the light source, and receives an input voltage from a power source and provides an output voltage to the light source. The power converter includes a switch coupled in series with the light source. The controller is coupled to the power converter and controls a power of the light source by controlling the switch. The voltage-controlled current source is coupled to the controller and provides a first current. The controller controls the switch based on the first current.

17 Claims, 10 Drawing Sheets

CIRCUITS AND METHODS FOR CONTROLLING POWER OF LIGHT SOURCES

RELATED APPLICATIONS

This application claims priority to Patent Application No. 201010176798.7, entitled Circuits and Methods for Controlling Power of Light Sources, filed on May 18, 2010 with State Intellectual Property Office of the People's Republic of China (SIPO).

BACKGROUND

FIG. 1 shows a schematic diagram of a conventional light source driving circuit 100. FIG. 2 shows waveforms 200 illustrating an operation of the light source driving circuit 100 in FIG. 1. FIG. 1 is described in combination with FIG. 2. The light source driving circuit 100 includes a bridge rectifier 104 and a capacitor 116 that covert an AC input voltage from an AC power source 102 to a DC input voltage $V_{IN}$ in order to power a light emitting diode (LED) string 108. The LED string 108 includes multiple LEDs connected series. The light source driving circuit 100 further includes a buck converter 111 including an inductor 118, a diode 106, and a switch 112. The buck converter 111 receives the DC input voltage $V_{IN}$ and provides an output voltage Vo for the LED string 108. A controller 110 monitors a current flowing through the LED string 108 based on a voltage across a resistor 114, and controls a conductance status of the switch 112. If the switch 112 is turned on, a current $I_{LED}$ flows through the LED string 108, the inductor 118, the switch 112 and the resistor 114 to ground. The current $I_{LED}$ increases when the switch 112 is on. If the current $I_{LED}$ increases to a predetermined peak value $I_{PEAK}$, the controller 110 turns off the switch 112. When the switch 112 is turned off, the current $I_{LED}$ flows through the LED string 108, the inductor 118, and the diode 106. The current $I_{LED}$ decreases when the switch 112 is off. The controller 110 turns the switch 112 on and off alternately. The controller 110 can work in two modes including a constant period mode and a constant off time mode.

In the constant period mode, the controller 110 turns the switch 112 on and off alternately and maintains a cycle period Ts of the switch 112 substantially constant. An average value $I_{AVG}$ of the current $I_{LED}$ can be given by:

$$I_{AVG} = I_{PEAK} - \frac{1}{2} \cdot \frac{(V_{IN} - V_O) \times \frac{V_O}{V_{IN}} \times T_S}{L}, \quad (1)$$

where $V_{IN}$ is the DC input voltage provided by the bridge rectifier 104 and the capacitor 116, Vo is the output voltage provided by the buck converter (i.e., the voltage across the LED string 108), L is the inductance of the inductor 118, Ts is the cycle period of the switch 112, and $I_{PEAK}$ is the peak value of the current $I_{LED}$.

In the constant off time mode, the controller 110 turns the switch 112 on and off alternately and maintains an off time $T_{OFF}$ of the switch 112 substantially constant. An average value $I_{AVG}$ of the current $I_{LED}$ can be given by:

$$I_{AVG} = I_{PEAK} - \frac{1}{2} \cdot \frac{V_O \times T_{OFF}}{L}, \quad (2)$$

where Vo is the output voltage provided by the buck converter 111 (i.e., the voltage across the LED string 108), L is the inductance of the inductor 118, $T_{OFF}$ is the off time of the switch 112, and $I_{PEAK}$ is the peak value of the current $I_{LED}$.

One of the drawbacks of the light driving circuit 100 is that the average value $I_{AVG}$ of the current $I_{LED}$ varies with the input voltage $V_{IN}$ and the output voltage Vo.

A first situation is that the average value $I_{AVG}$ of the current $I_{LED}$ increases as the input voltage $V_{IN}$ increases. In the constant off time mode, since there may be a system delay between the time when the current $I_{LED}$ increases to the peak value $I_{PEAK}$ and the time when the controller 110 turns off the switch 112, the current $I_{LED}$ will continue to increase for a time period after it reaches the peak value $I_{PEAK}$. Therefore, if the input voltage $V_{IN}$ increases, the average value $I_{AVG}$ of the current $I_{LED}$ increases accordingly.

A second situation is that the average value $I_{AVG}$ of the current $I_{LED}$ decreases as the input voltage $V_{IN}$ increases. In the constant period mode, according to equation (1), if the input voltage $V_{IN}$ increases, the average value $I_{AVG}$ of the current $I_{LED}$ decreases accordingly.

A third situation is that the average value $I_{AVG}$ of the current $I_{LED}$ decreases as the output voltage Vo increases. In the constant off time mode, according to equation (2), if the output voltage Vo increases, the average value $I_{AVG}$ of the current $I_{LED}$ decreases accordingly.

SUMMARY

A driving circuit for driving a light source includes a power converter, a controller and a voltage-controlled current source. The power converter is coupled to the light source, and receives an input voltage from a power source and provides an output voltage to the light source. The power converter includes a switch coupled in series with the light source. The controller is coupled to the power converter and controls a power of the light source by controlling the switch. The voltage-controlled current source is coupled to the controller and provides a first current. The controller controls the switch based on the first current.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
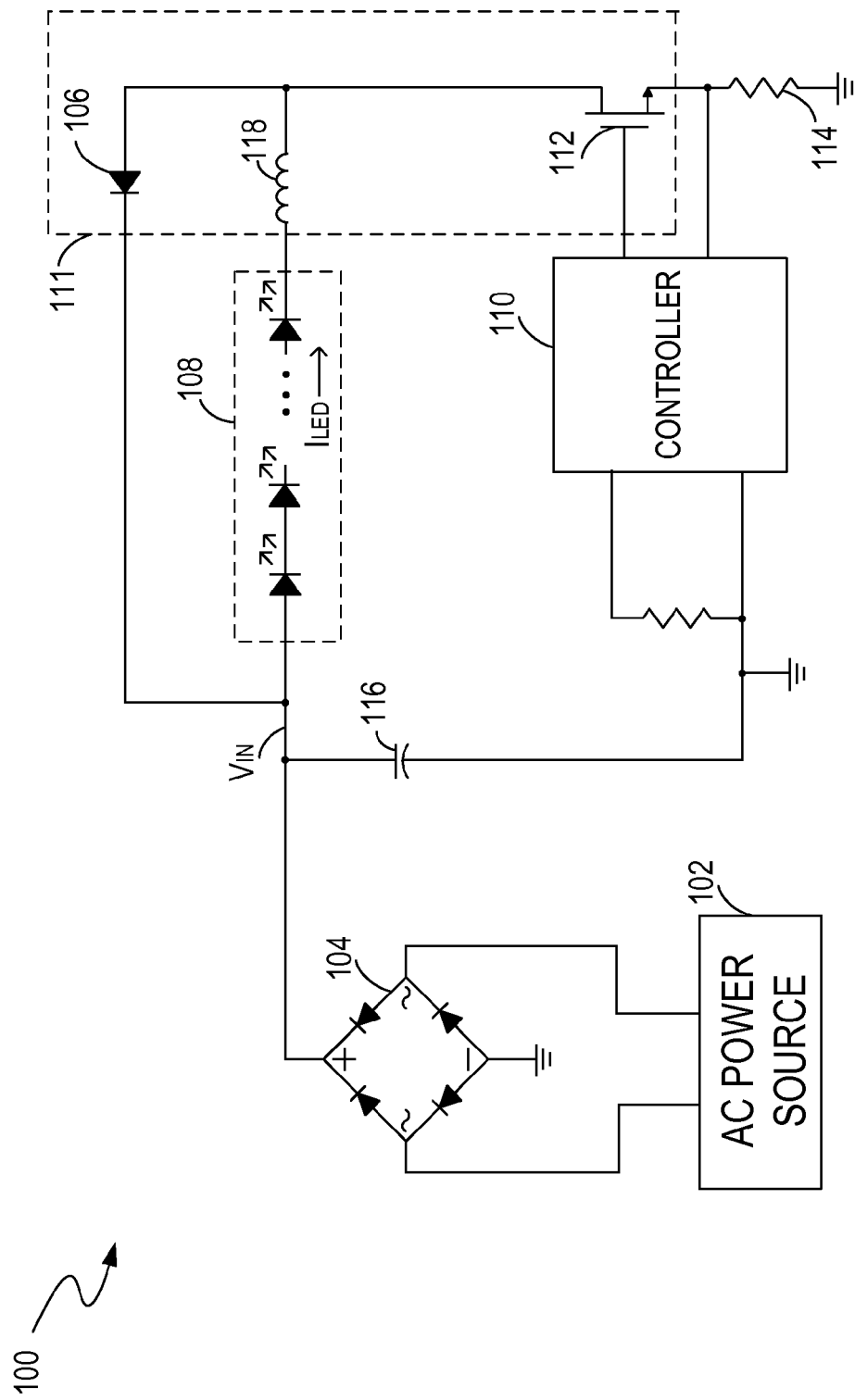
FIG. 1 shows a schematic diagram of a conventional light source driving circuit.
Figure 2:
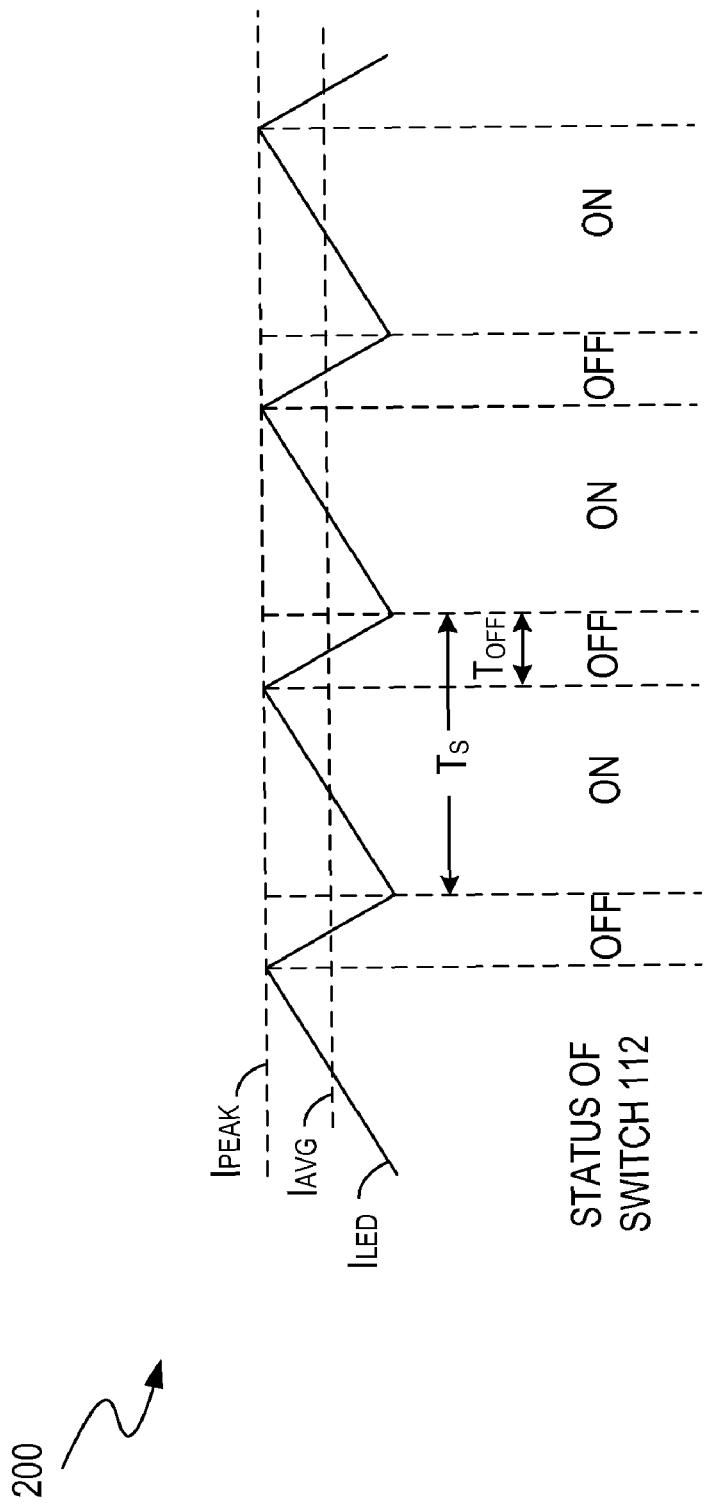
FIG. 2 shows waveforms illustrating an operation of the light source driving circuit in FIG. 1.
Figure 3:
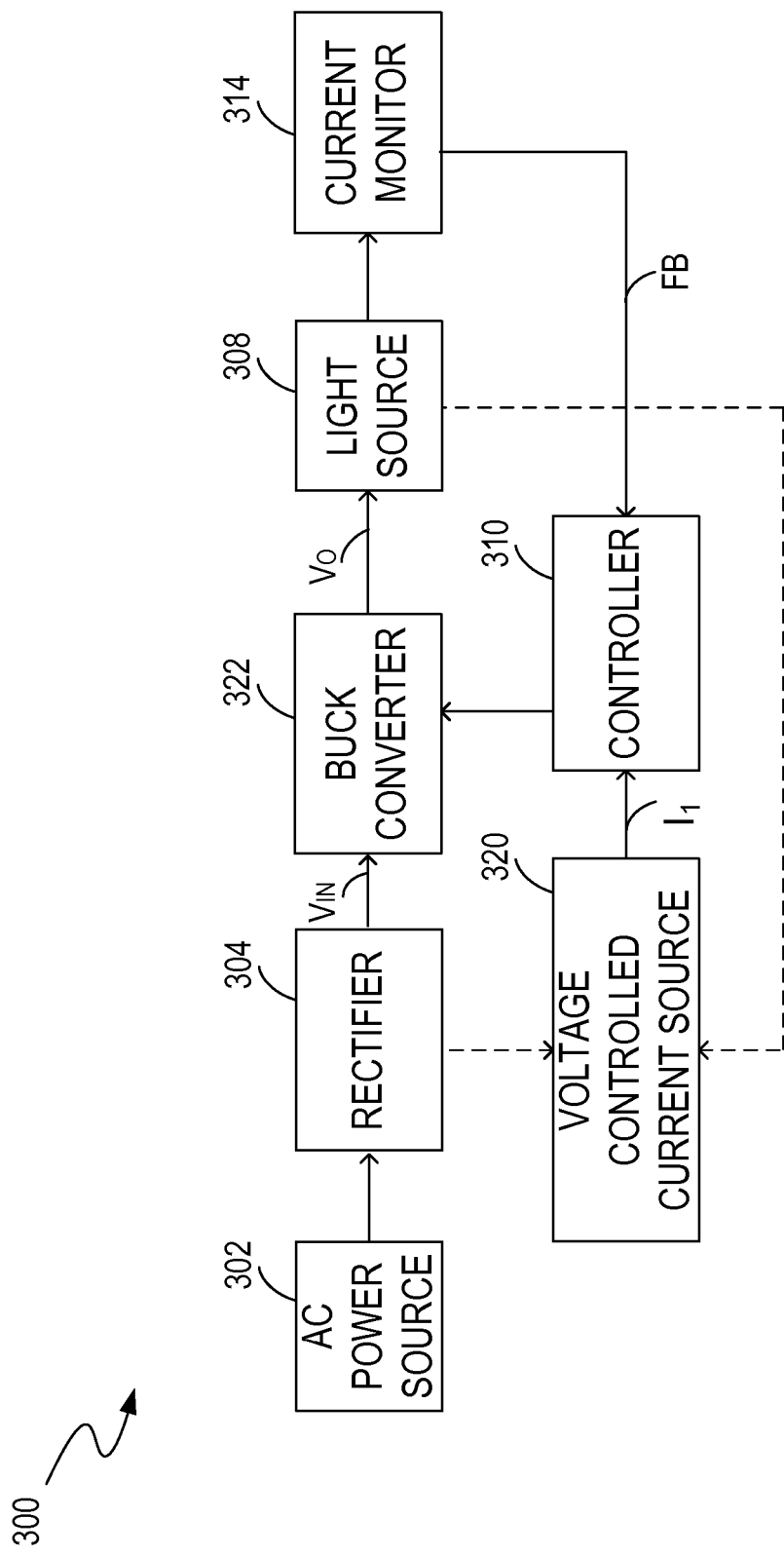
FIG. 3 shows a block diagram of a light source driving circuit, in accordance with one embodiment of the present invention.

FIG. 3 shows a block diagram of a light source driving circuit 300, in accordance with one embodiment of the present invention. The light source driving circuit 300 includes a rectifier 304 coupled between an AC power source 302 and a light source 308, a power converter (e.g., a buck converter 322) coupled to the light source 308, a controller 310 coupled to the buck converter 322, a voltage-controlled current source 320 coupled to the controller 310, and a current sensor 314 coupled to the light source 308. The rectifier 304 converts an AC input voltage provided by the AC power source 302 to a DC input voltage $V_{IN}$. The buck converter 322 receives the DC input voltage $V_{IN}$ and provides an output voltage Vo for the light source 308. The current sensor 314 provides a feedback signal FB indicating a current of the light source 308. The voltage-controlled current source 320 provides a current $I_1$. In one embodiment, the voltage-controlled current source 320 is coupled to the rectifier 304, and provides the current $I_1$ based on the DC input voltage $V_{IN}$. In anther embodiment, the voltage-controlled current source 320 is coupled to the light source 308, and provides the current $I_1$ based on the voltage of the light source 308 (e.g., the output voltage Vo provided by the buck converter 322). If the input voltage $V_{IN}$ or the output voltage Vo varies, the current $I_1$ changes accordingly. The controller 310 receives the feedback signal FB from the current sensor 314, and controls the buck converter 322 based on the current $I_1$ so as to reduce or eliminate the variation of the average current of the light source 308.

Figure 4:
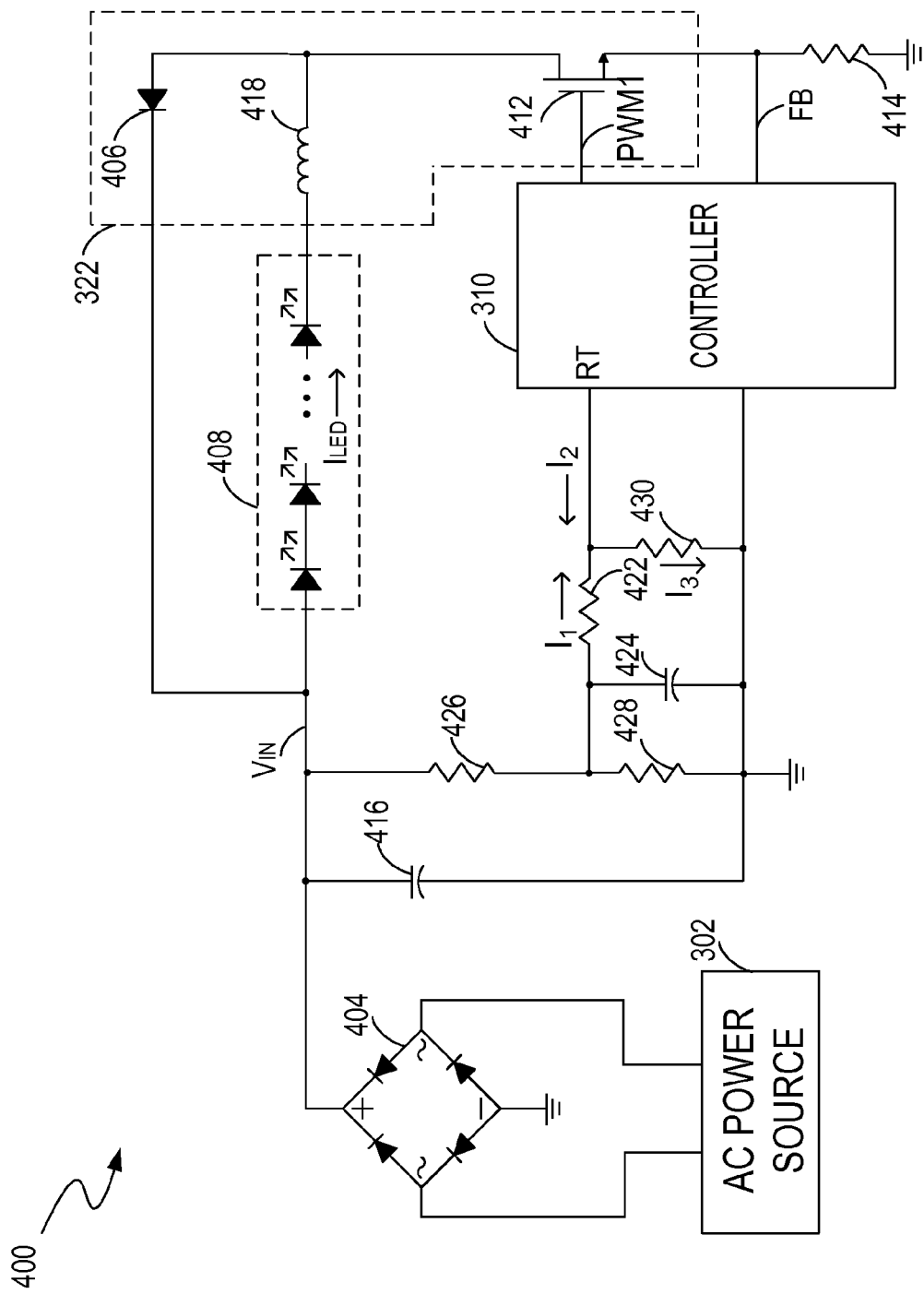
FIG. 4 shows a schematic diagram of a light source driving circuit, in accordance with one embodiment of the present invention.

FIG. 4 shows a schematic diagram of a light source driving circuit 400, in accordance with one embodiment of the present invention. Elements labeled the same as in FIG. 3 have similar functions. In the example of FIG. 4, the light source driving circuit 400 drives an LED string 408. The light source driving circuit 400 includes a bridge rectifier 404 coupled between an AC power source 302 and the LED string 408, a buck converter 322 coupled to the LED string 408, a controller 310 coupled to the buck converter 322, a voltage-controlled current source coupled to the controller 310, and a current sensor (e.g., a resistor 414) coupled to the LED string 408. In the example of FIG. 4, the buck converter 322 includes a diode 406, an inductor 418, and a switch 412 which is coupled in series with the LED string 408. The bridge rectifier 404 and the capacitor 416 converts an AC input voltage provided by the AC power source 302 to a DC voltage $V_{IN}$. The buck converter 322 receives the DC voltage $V_{IN}$ and provides an output voltage Vo for the LED string 408. In the example of FIG. 4, the voltage-controlled current source includes a resistor 422 coupled to the controller 310 through a terminal RT of the controller 310. The resistor 422 is coupled to the bridge rectifier 404 through a voltage divider which includes a resistor 426 and a resistor 428. A current $I_1$ flows through the resistor 422 to the terminal RT of the controller 310. The current $I_1$ is proportional to the DC voltage $V_{IN}$. The resistor 414 provides a feedback signal FB which indicates a current of the LED string 408 when the switch 412 is on. A capacitor 424 coupled in parallel with the resistor 428 filters noise of the DC voltage $V_{IN}$. A resistor 430 has one end coupled to a common node between the resistor 422 and the terminal RT of the controller 310, and the other end coupled to ground. The controller 310 outputs a current $I_2$ via the terminal RT. A current $I_3$ flowing through the resistor 430 is proportional to the current $I_1$ and proportional to the current $I_2$. The controller 310 receives the feedback signal FB from the resistor 414, and generate a control signal (e.g., a pulse-width modulation signal PWM1) to control the switch 412.

Figure 5:
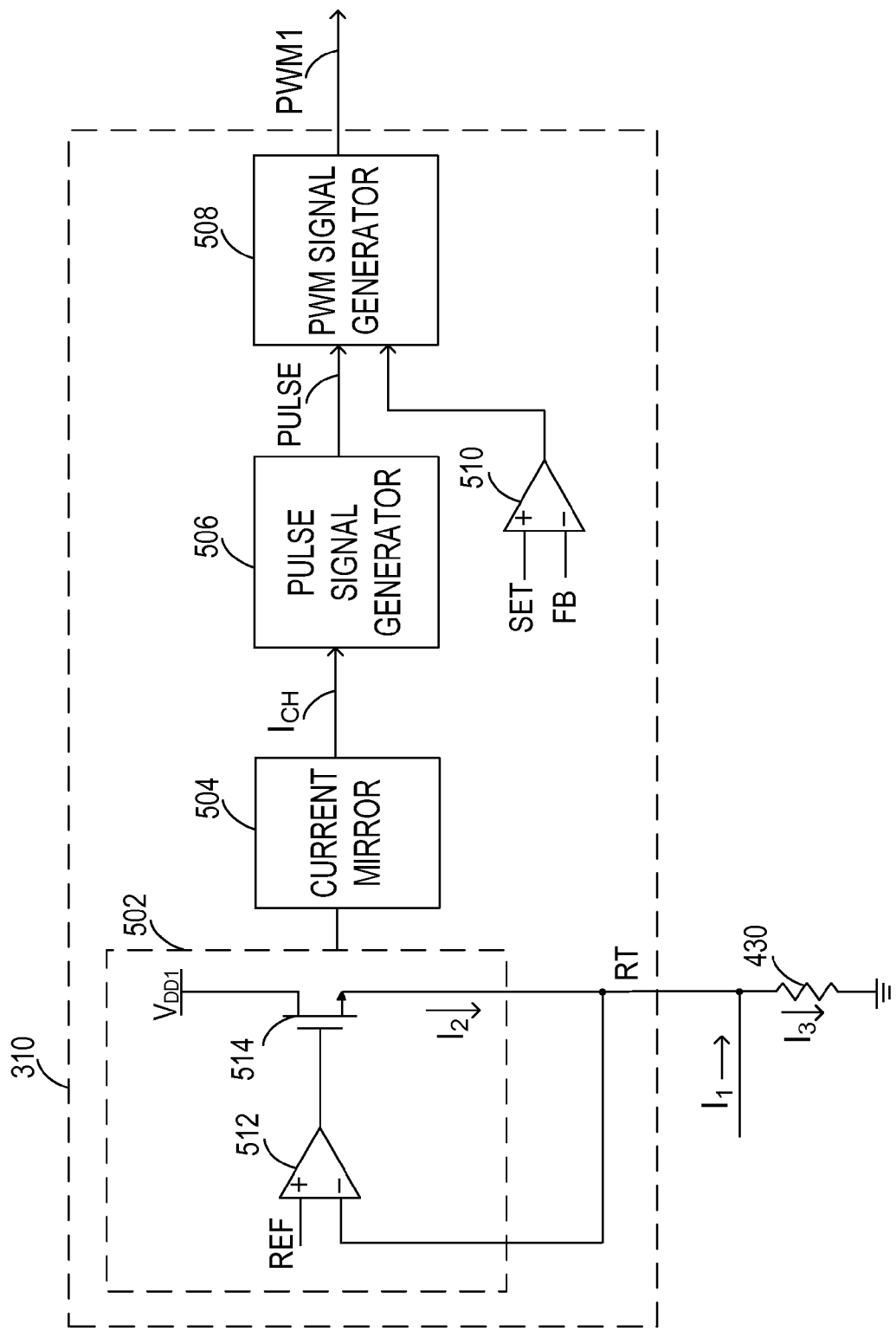
FIG. 5 shows an example of a controller in FIG. 4, in accordance with one embodiment of the present invention.
Figure 6:
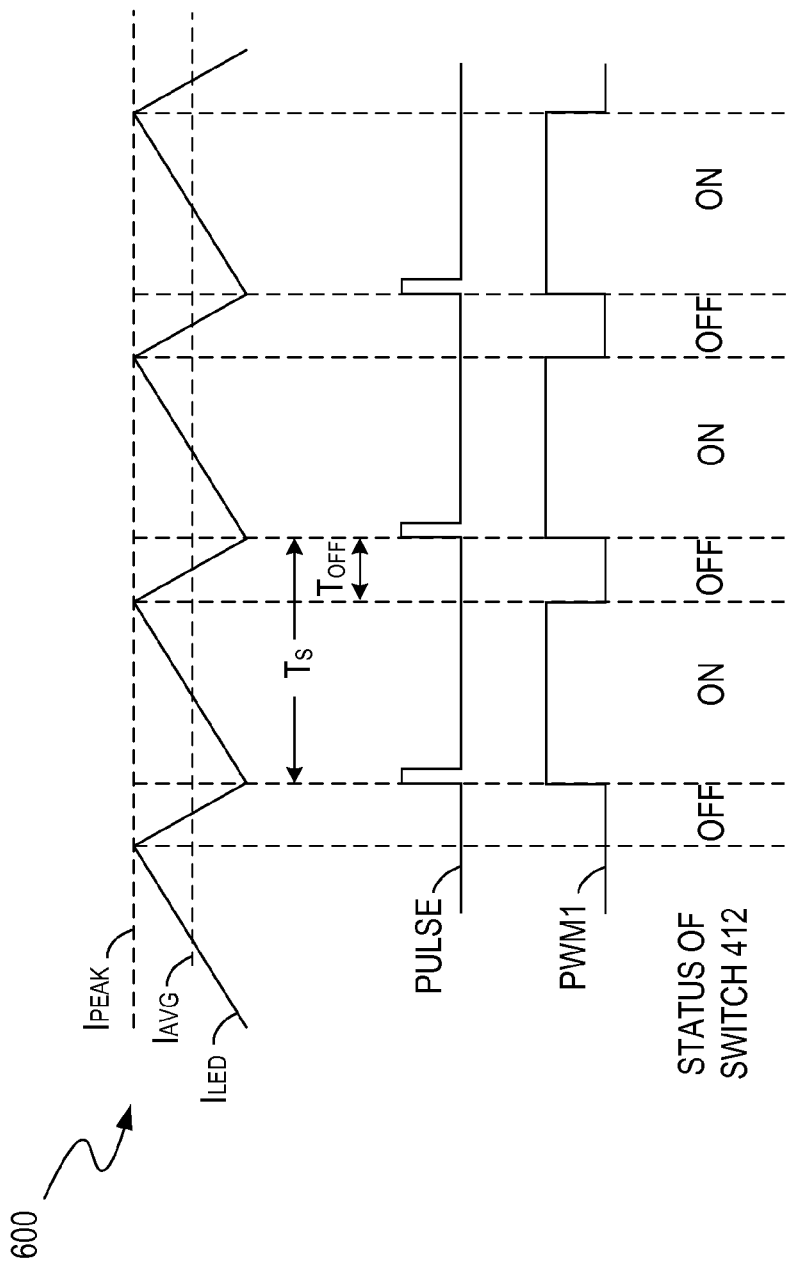
FIG. 6 shows waveforms illustrating an operation of the light source driving circuit in FIG. 4.

FIG. 5 shows an example of the controller 310 in FIG. 4, in accordance with one embodiment of the present invention. FIG. 6 shows waveforms illustrating an operation of the light source driving circuit 400 in FIG. 4. FIG. 5 is described in combination with FIG. 4 and FIG. 6. In one embodiment, the controller 310 includes a current generator 502, a current mirror 504, a pulse signal generator 506, a pulse-width modulation (PWM) signal generator 508 and a comparator 510. The current generator 502 generates a current $I_2$ and adjusts a level of the current $I_2$ based on a current $I_1$. The current $I_2$ flows out of the terminal RT, through the resistor 430 to ground. The current mirror 504 provides a current $I_{CH}$ which is proportional to the current $I_2$. The pulse signal generator 506 generates a pulse signal PULSE. A pulse density of the pulse signal PULSE is proportional to the current $I_{CH}$. The comparator 510 compares the feedback signal FB with a reference signal SET. The voltage of feedback signal FB indicates a current $I_{LED}$ of the LED string 408 when switch 412 is on. The reference signal SET determines a peak value of the current $I_{LED}$. The PWM signal generator 508 receives the pulse signal PULSE and the comparison result of the comparator 510, and generates the pulse-width modulation signal PWM1 to control the switch 412. If the voltage of feedback signal FB increases to the voltage of the reference signal SET, which indicates that the current $I_{LED}$ of the LED string 408 reaches the peak value $I_{PEAK}$, the PWM signal generator 508 generates the pulse-width modulation signal PWM1 having a first state (e.g., digital 0) to turn off the switch 412. The PWM signal generator 508 generates the pulse-width modulation signal PWM1 having a second state (e.g., digital 1) to turn on the switch 412 in response to a pulse in the pulse signal PULSE. In one embodiment, current generator 502 includes a switch 514 coupled between a power source $V_{DD1}$ and the terminal RT, and an operational amplifier 512 coupled to the switch 514. A non-inverting input of the operational amplifier 512 receives a reference signal REF. An inverting input of the operational amplifier 512 is coupled to the resistor 430 through the terminal RT. The operational amplifier 512 adjusts the current $I_2$ by controlling a conductance status of the switch 514 linearly, such that the voltage across the resistor 430 (i.e., the voltage at the terminal RT) can follow the voltage of the reference signal REF. As such, a level of the current $I_3$ flowing through the resistor 430 is determined by the voltage of the reference signal REF and a resistance of the resistor 430, and thus the current $I_3$ is substantially constant. As used herein, "substantially constant" means that the current $I_3$ may vary but within a range such that the current ripple caused by non-ideality of the circuit components can be neglected. On the other hand, the current $I_3$ is determined by the current $I_1$ and the current $I_2$. In the example of FIG. 4, the current $I_3$ is proportional to the current $I_1$ and proportional to the current $I_2$, and can be given by:

$$I_3 = I_1 + I_2. \tag{3}$$

In the constant off time mode, i.e., the controller 310 turns the switch 412 on and off alternately and maintains an off time $T_{OFF}$ of the switch 412 (shown in FIG. 4) substantially constant, the average value $I_{AVG}$ of the current $I_{LED}$ increases as the input voltage $V_{IN}$ increases. On the other hand, if the input voltage $V_{IN}$ increases, the current $I_1$ increases accordingly, and the operational amplifier 512 controls the switch 514 to reduce the current $I_2$ in order to maintain the current $I_3$ constant. The current $I_{CH}$ which is provided by the current mirror 504 decreases as the current $I_2$ decreases. The pulse density of the pulse signal PULSE decreases as the current $I_{CH}$ decreases. In the constant off time mode, the decrease of the pulse density of the pulse signal PULSE results in an increase of the off time $T_{OFF}$ of the switch 412 (shown in FIG. 4). The average value $I_{AVG}$ of the current $I_{LED}$ decreases as the off time $T_{OFF}$ increases. Consequently, the light source driving circuit 400 is capable of reducing or eliminating the variation of the average value $I_{AVG}$ of the current $I_{LED}$ which is caused by the variation of the input voltage $V_{IN}$. Therefore, the average value $I_{AVG}$ of the current $I_{LED}$ is relatively stable.

Figure 7:
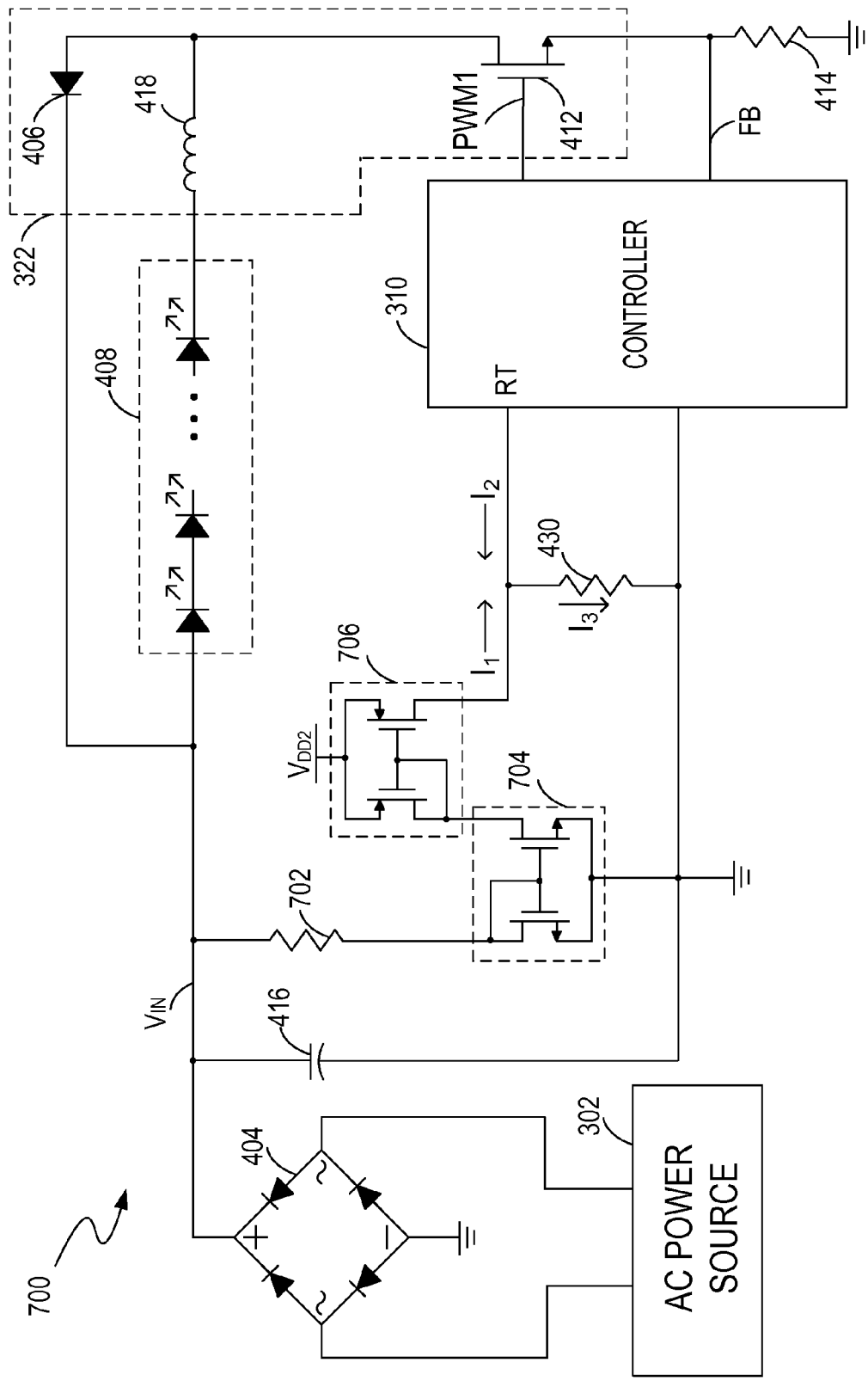
FIG. 7 shows a schematic diagram of a light source driving circuit, in accordance with one embodiment of the present invention.

FIG. 7 shows a schematic diagram of a light source driving circuit 700, in accordance with one embodiment of the present invention. Elements labeled the same as in FIG. 4 have similar functions. In the example of FIG. 7, the voltage-controlled current source includes a current mirror 704 and a current mirror 706. The current mirror 704 is coupled to the bridge rectifier 404 through a resistor 702. The current mirror 706 is coupled between the current mirror 704 and a power source $V_{DD2}$, and provides a current $I_1$ which is proportional to the input voltage $V_{IN}$. Similar to the example in FIG. 4, the current $I_3$ is proportional to the current $I_1$ and proportional to the current $I_2$. In the constant off time mode, the average value $I_{AVG}$ of the current $I_{LED}$ increases as the input voltage $V_{IN}$ increases. On the other hand, if the input voltage $V_{IN}$ increases, the current $I_1$ increases and the current $I_2$ decreases accordingly. The decrease of the current $I_2$ results in an increase of the off time $T_{OFF}$ and a decrease of the average value $I_{AVG}$ of the current $I_{LED}$. Consequently, the light source driving circuit 700 is capable of reducing the variation of the average value $I_{AVG}$ of the current $I_{LED}$ which is caused by the variation of the input voltage $V_{IN}$. Therefore, the average value $I_{AVG}$ of the current $I_{LED}$ is relatively stable.

Figure 8:
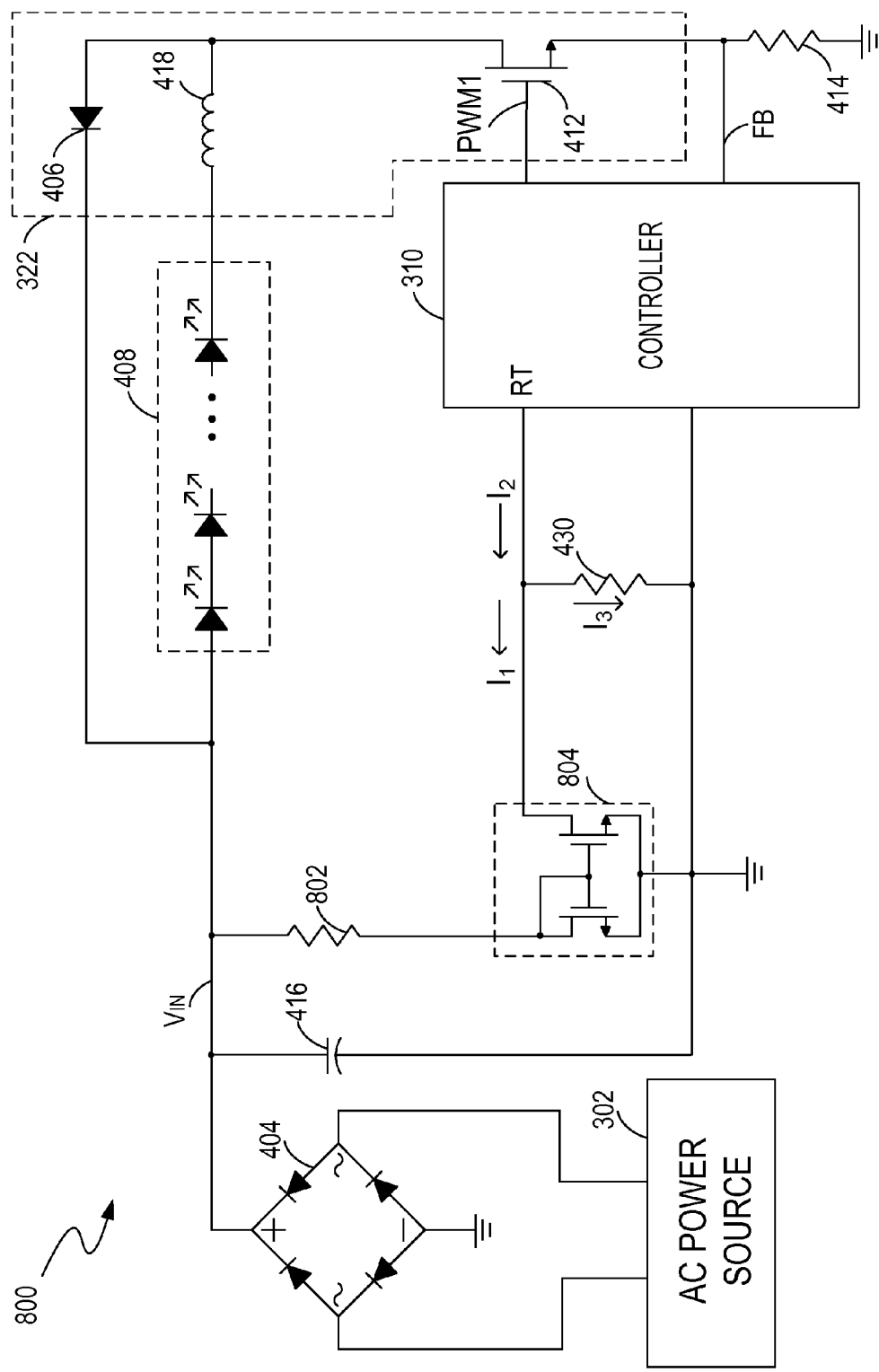
FIG. 8 shows a schematic diagram of a light source driving circuit, in accordance with one embodiment of the present invention.

FIG. 8 shows a schematic diagram of a light source driving circuit 800, in accordance with one embodiment of the present invention. Elements labeled the same as in FIG. 4 have similar functions. In the example of FIG. 8, the voltage-controlled current source includes a current mirror 804. The current mirror 804 is coupled to the bridge rectifier 404 through a resistor 802, and provides a current $I_1$ which is proportional to the input voltage $V_{IN}$. In the example of FIG. 8, the current $I_3$ flowing through resistor 430 is inversely proportional to the current $I_1$, and proportional to the current $I_2$. The current $I_3$ can be given by:

$$I_3 = I_2 - I_1. \tag{4}$$

In the constant period mode, the average value $I_{AVG}$ of the current $I_{LED}$ decreases as the input voltage $V_{IN}$ increases. On the other hand, if the input voltage $V_{IN}$ increases, the current $I_1$ increases and the current $I_2$ increases accordingly. The increase of the current $I_2$ can result in a decrease of the period Ts. According to equation (1), the average value $I_{AVG}$ of the current $I_{LED}$ increases as the period Ts decreases. Consequently, the light source driving circuit 800 is capable of reducing the variation of the average value $I_{AVG}$ of the current $I_{LED}$ which is caused by the variation of the input voltage $V_{IN}$. Therefore, the average value $I_{AVG}$ of the current $I_{LED}$ is relatively stable.

Figure 9:
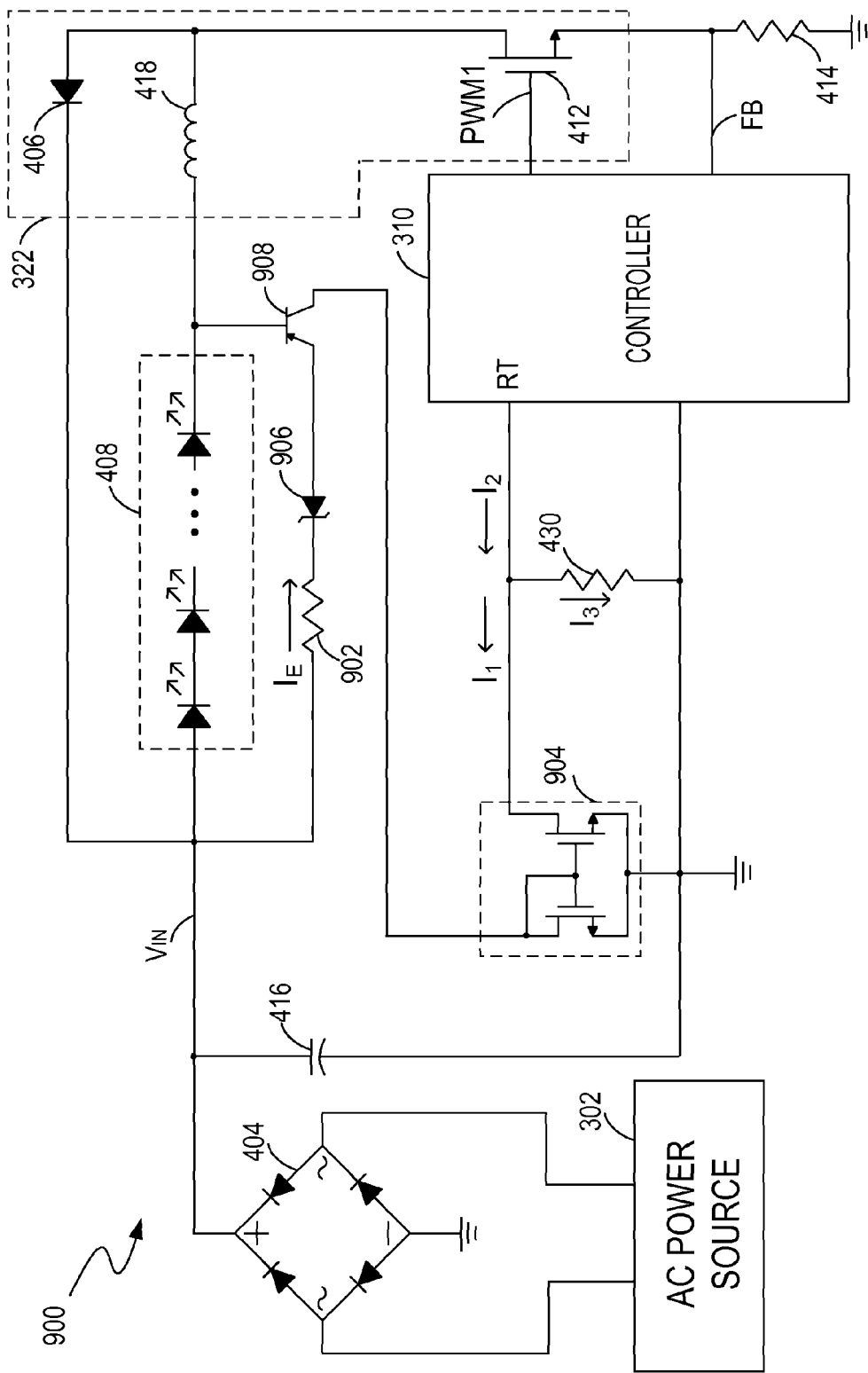
FIG. 9 shows a schematic diagram of a light source driving circuit, in accordance with one embodiment of the present invention.

FIG. 9 shows a schematic diagram of a light source driving circuit 900, in accordance with one embodiment of the present invention. Elements labeled the same as in FIG. 4 have similar functions. In the example of FIG. 9, the voltage-controlled current source includes a current mirror 904. The current mirror 904 is coupled to the LED string 408 through a transistor 908, and provides a current $I_1$ which is proportional to a voltage across the LED string 408 (e.g., the output voltage Vo of the buck converter 322). The output voltage Vo depends on the number of LEDs of the LED string 408. A resistor 902 and a Zener diode 906 are coupled in parallel with the LED string 408 through the transistor 908. Assuming that a breakdown voltage of the Zener diode 906 is $V_{ZD}$, a resistance of the resistor 902 is R, and neglecting a voltage drop across the base and the emitter of the transistor 908, a current $I_E$ flowing through the resistor 902 can be given by:

$$I_E = \frac{V_O - V_{ZD}}{R}. \tag{5}$$

The current $I_1$ provided by the current mirror 904 is proportional to the current $I_E$. Therefore, the current $I_1$ is also proportional to the output voltage Vo. In the example of FIG. 9, the current $I_3$ flowing through resistor 430 is inversely proportional to the current $I_1$ and proportional to the current $I_2$. In the constant off time mode, the average value $I_{AVG}$ of the current $I_{LED}$ decreases as the output voltage Vo increases. On the other hand, if the output voltage Vo increases, the current $I_1$ increases and the current $I_2$ increases accordingly. The increase of the current $I_2$ can result in a decrease of the off time $T_{OFF}$. The average value $I_{AVG}$ of the current $I_{LED}$ increases as the off time $T_{OFF}$ decreases. Consequently, the light source driving circuit 900 is capable of reducing the variation of the average value $I_{AVG}$ of the current $I_{LED}$ which is caused by the variation of the output voltage Vo. Therefore, the average value $I_{AVG}$ of the current $I_{LED}$ is relatively stable.

Figure 10:
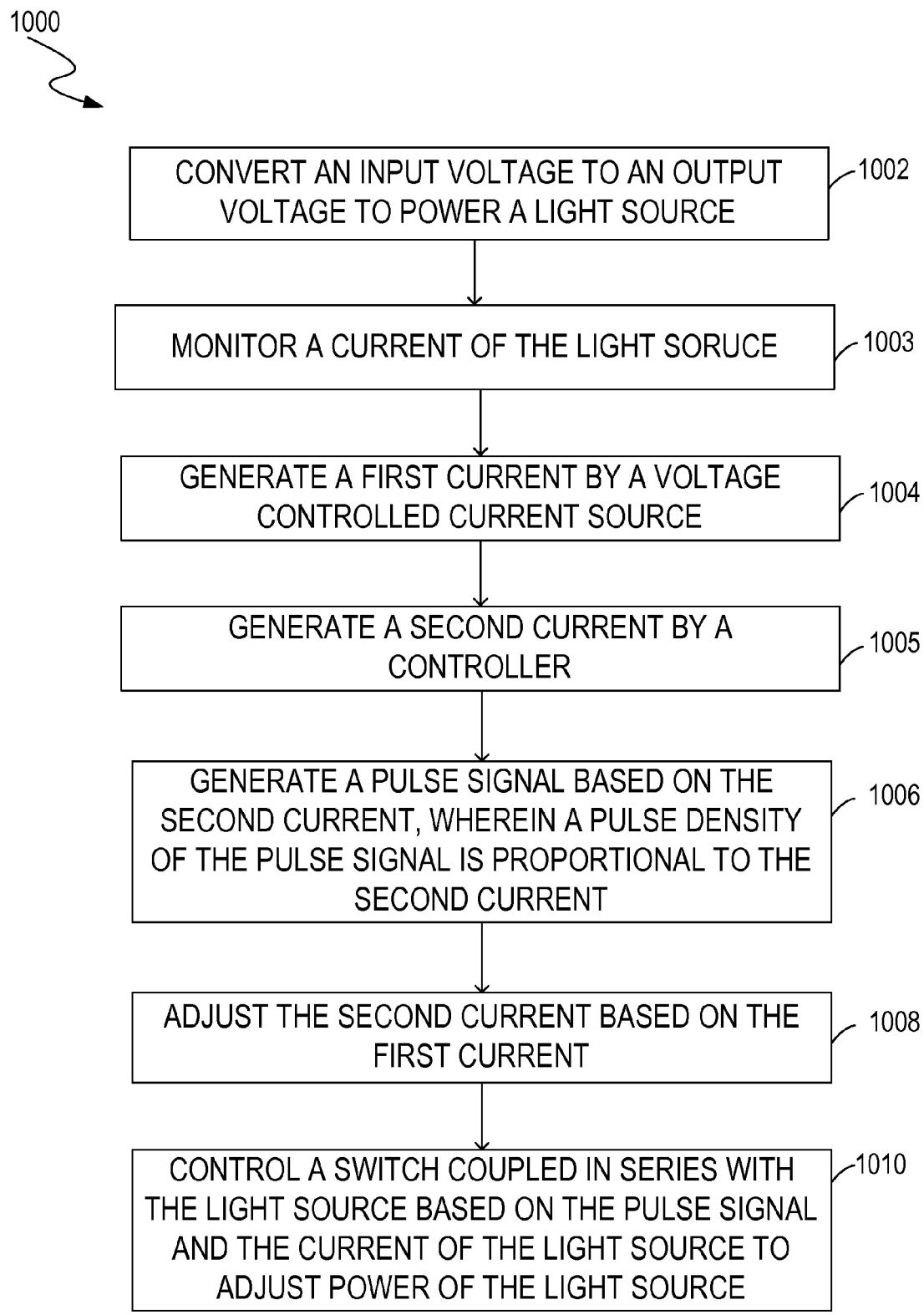
FIG. 10 shows a flowchart of a method for adjusting power of a light source, in accordance with one embodiment of the present invention.

FIG. 10 shows a flowchart 1000 of a method for adjusting power of a light source, in accordance with one embodiment of the present invention. FIG. 10 is described in combination with FIG. 3, FIG. 4 and FIG. 5.

In block 1002, an input voltage provided by a power source is converted to an output voltage (e.g., by a buck converter 322) to power a light source (e.g., a LED string 408).

In block 1003, a current of the light source is monitored, e.g., by a current sensor 314.

In block 1004, a current $I_1$ is generated, e.g., by a voltage-controlled current source 320. In one embodiment, the voltage-controlled current source 320 generates the current $I_1$ based on the input voltage provided by the power source. In another embodiment, the voltage-controlled current source 320 generates the current $I_1$ based on the output voltage across the light source.

In block 1005, a current $I_2$ is generated, e.g., by a controller 310.

In block 1006, a pulse signal is generated, e.g., by a pulse signal generator 506 based on the current $I_2$. A pulse density of the pulse signal is proportional to the current $I_2$.

In block 1008, the current $I_2$ is adjusted based on the current $I_1$, e.g., by the controller 310. In one embodiment, a current $I_3$ is generated by a combination of the current $I_1$ and the current $I_2$. The current $I_2$ is adjusted based on the current $I_1$ to maintain the current $I_3$ substantially constant. In one embodiment, the current $I_2$ decreases to maintain the current $I_3$ substantially constant if the current $I_1$ increases. In another embodiment, the current $I_2$ increases to maintain the current $I_3$ substantially constant if the current $I_1$ increases.

In block 1010, a switch coupled in series with the light source, e.g., the switch 412, is controlled based on the pulse signal and the current of the light source to adjust power of the light source. In one embodiment, the switch is turned on in response to the pulse signal and is turned off if the current of the light source increases to a predetermined peak value.

Accordingly, embodiments in accordance with the present invention provide light source driving circuits that utilize a voltage-controlled current source to adjust power of a light source. The voltage-controlled current source generates a current $I_1$ based on an input voltage provided by a power source or based on an output voltage across the light source. A controller generates a current $I_2$, and adjusts the current $I_2$ based on the current $I_1$. A pulse signal generator generates a pulse signal based on the current $I_2$ to control a switch coupled in series with the light source to adjust power of the light source. Advantageously, the light source driving circuits is capable of reducing the variation of an average current level of the light source which is caused by the variation of the input voltage or the output voltage. As such, the brightness of the light source is relatively stable.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A driving circuit for driving a light emitting diode (LED) light source, comprising:

a power converter coupled to said LED light source and operable for receiving an input voltage from a power source and for providing an output voltage to said LED light source, said power converter comprising a switch coupled in series with said LED light source;

a controller coupled to said power converter and operable for controlling a power of said LED light source by controlling said switch;

a voltage-controlled current source coupled to said controller and operable for providing a first current, wherein said controller controls said switch based on said first current; and a first resistor coupled between said controller and ground, wherein said controller is operable for providing a second current, wherein a third current flowing through said first resistor is determined by a combination of said first current and said second current, wherein said controller is operable for adjusting said second current based on said first current to maintain said third current substantially constant, and wherein said controller is operable for generating a control signal based on said second current to control said switch.

2. The driving circuit of claim 1, wherein said controller comprises a pulse signal generator operable for generating a pulse signal based on said first current, and wherein said controller is operable for turning on said switch in response to said pulse signal and is operable for turning off said switch if a current of said LED light source increases to a predetermined peak value.

3. The driving circuit of claim 1, wherein said controller comprises an operational amplifier operable for adjusting said second current by comparing a voltage drop across said first resistor with a predetermined voltage level.

4. The driving circuit of claim 1, wherein said voltage-controlled current source is coupled to said power source and is operable for providing said first current based on said input voltage.

5. The driving circuit of claim 4, wherein said voltage-controlled current source comprises a second resistor coupled between said power source and said controller, wherein said second resistor is operable for providing said first current, wherein said third current is proportional to said first current and proportional to said second current, and wherein said first current increases if said input voltage increases, and said controller decreases said second current to maintain said third current substantially constant if said first current increases.

6. The driving circuit of claim 4, wherein said voltage-controlled current source comprises a first current mirror and a second current mirror which are coupled between said power source and said controller, wherein said first current mirror and said second current mirror are operable for providing said first current, wherein said third current is proportional to said first current and proportional to said second current, and wherein said first current increases if said input voltage increases, and said controller decreases said second current to maintain said third current substantially constant if said first current increases.

7. The driving circuit of claim 4, wherein said voltage-controlled current source comprises a current mirror coupled between said power source and said controller, wherein said current mirror is operable for providing said first current, wherein said third current is inversely proportional to said first current and proportional to said second current, and wherein said first current increases if said input voltage increases and said controller increases said second current to maintain said third current substantially constant.

8. The driving circuit of claim 1, wherein said voltage-controlled current source is coupled to said LED light source and is operable for providing said first current based on said output voltage.

9. The driving circuit of claim 8, wherein said voltage-controlled current source comprises a current mirror coupled between said LED light source and said controller, wherein said current mirror is operable for providing said first current, wherein said third current is inversely proportional to said first current and proportional to said second current, and wherein said first current increases if said output voltage increases and said controller increases said second current to maintain said third current substantially constant if said first current increases.

10. A driving circuit for controlling power of a light emitting diode (LED) light source, comprising:
a voltage-controlled current source operable for providing a first current;
a controller coupled to said voltage-controlled current source and operable for providing a second current;
a pulse signal generator operable for generating a pulse signal based on said second current to control a switch coupled in series with said LED light source, wherein said controller is operable for adjusting said second current based on said first current; and
a first resistor coupled between said controller and ground, wherein a third current flowing through said first resistor is determined by a combination of said first current and said second current, and wherein said controller adjusts said second current based on said first current to maintain said third current substantially constant.

11. The driving circuit of claim 10, wherein said switch is turned on in response to said pulse signal and is turned off if a current of said LED light source increases to a predetermined peak value.

12. The driving circuit of claim 10, wherein said voltage-controlled current source is coupled to a power source and is operable for providing said first current based on an input voltage provided by said power source.

13. The driving circuit of claim 12, wherein said voltage-controlled current source comprises a second resistor coupled between said power source and said controller, wherein said second resistor is operable for providing said first current, wherein said third current is proportional to said first current and proportional to said second current, and wherein said first current increases if said input voltage increases, and said controller decreases said second current to maintain said third current substantially constant if said first current increases.

14. The driving circuit of claim 12, wherein said voltage-controlled current source comprises a first current mirror and a second current mirror which are coupled between said power source and said controller, wherein said first current mirror and said second current mirror are operable for providing said first current, wherein said third current is proportional to said first current and proportional to said second current, and wherein said first current increases if said input voltage increases and said controller decreases said second current to maintain said third current substantially constant if said first current increases.

15. The driving circuit of claim 12, wherein said voltage-controlled current source comprises a current mirror coupled between said power source and said controller, wherein said current mirror is operable for providing said first current, wherein said third current is inversely proportional to said first current and proportional to said second current, and wherein said first current increases if said input voltage increases and said controller increases said second current to maintain said third current substantially constant if said first current increases.

16. The driving circuit of claim 10, wherein said voltage-controlled current source is coupled to said LED light source and is operable for providing said first current based on an output voltage across said LED light source.

17. The driving circuit of claim 16, wherein said voltage-controlled current source comprises a current mirror coupled between said LED light source and said controller, wherein said current mirror is operable for providing said first current, wherein said third current is inversely proportional to said first current and proportional to said second current, and wherein said first current increases if said output voltage increases and said controller increases said second current to maintain said third current substantially constant if said first current increases.

* * * * *